United States Patent
Fünfschilling et al.

[11] Patent Number: 5,760,863
[45] Date of Patent: Jun. 2, 1998

[54] DHF FERROELECTRIC LIQUID CRYSTALLINE DISPLAY, SWITCHING OR IMAGE PROCESSING APPARATUS

[75] Inventors: Jürg Fünfschilling, Basel; Martin Schadt, Seltisberg, both of Switzerland

[73] Assignee: Rolic AG, Zug, Switzerland

[21] Appl. No.: 872,661

[22] Filed: Jun. 10, 1997

[30] Foreign Application Priority Data

Jun. 12, 1996 [CH] Switzerland ............... 1468/96

[51] Int. Cl.$^6$ .................................... G02F 1/141
[52] U.S. Cl. ................ 349/172; 349/100; 349/144
[58] Field of Search ............................ 349/100, 172, 349/173, 106, 144; 345/87, 88, 89

[56] References Cited

U.S. PATENT DOCUMENTS 5,539,555  7/1996  Wand et al. ................ 349/171

FOREIGN PATENT DOCUMENTS 309774  4/1989  European Pat. Off. .
686957  12/1995  European Pat. Off. .

OTHER PUBLICATIONS

Abdulhalim and G. Moddel Molecular Crystals and Liquid Crystals, 1991 (200) May, pp. 79 to 101, May 1991.
J. Fünfschilling and M. Schadt Journal of Applied Physics, 66 (1989) No. 8, pp. 3877 to 3882, 15 Oct. 1989.

*Primary Examiner*—William L. Sikes
*Assistant Examiner*—Tai V. Duong
*Attorney, Agent, or Firm*—Anderson Kill & Olick, P.C.

[57] ABSTRACT

The commercial production of DHF cells, in particular a colored DHF display cell, has scarcely become established to date. This is because in particular such cells based on the known prior art expediently must possess a liquid crystal layer having a thickness d of about 1.4 to 2.8 μm, which requires an expensive and complex production process. On the basis of the knowledge that the mean value of the refractive index of a DHF display can be described with that of a birefringent plate, it has now been found that the magnitude of the birefringence Δn changes significantly within a voltage range typical for DHF cells, in particular for DHF displays having a large switching angle α. The present invention therefore relates to the utilization of this second effect of the voltage dependence of Δn, with the object of substantially facilitating the production of DHF displays.

5 Claims, 5 Drawing Sheets

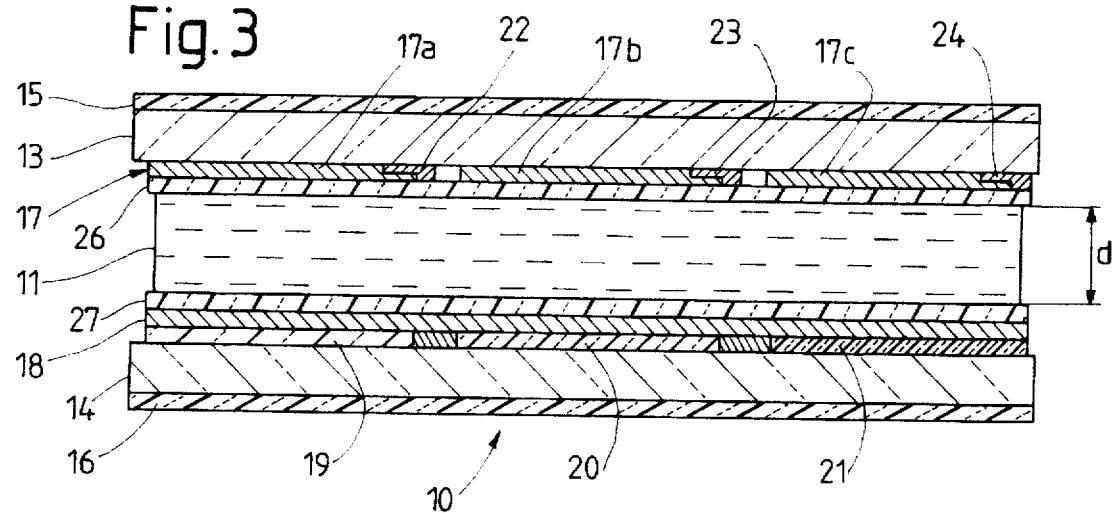
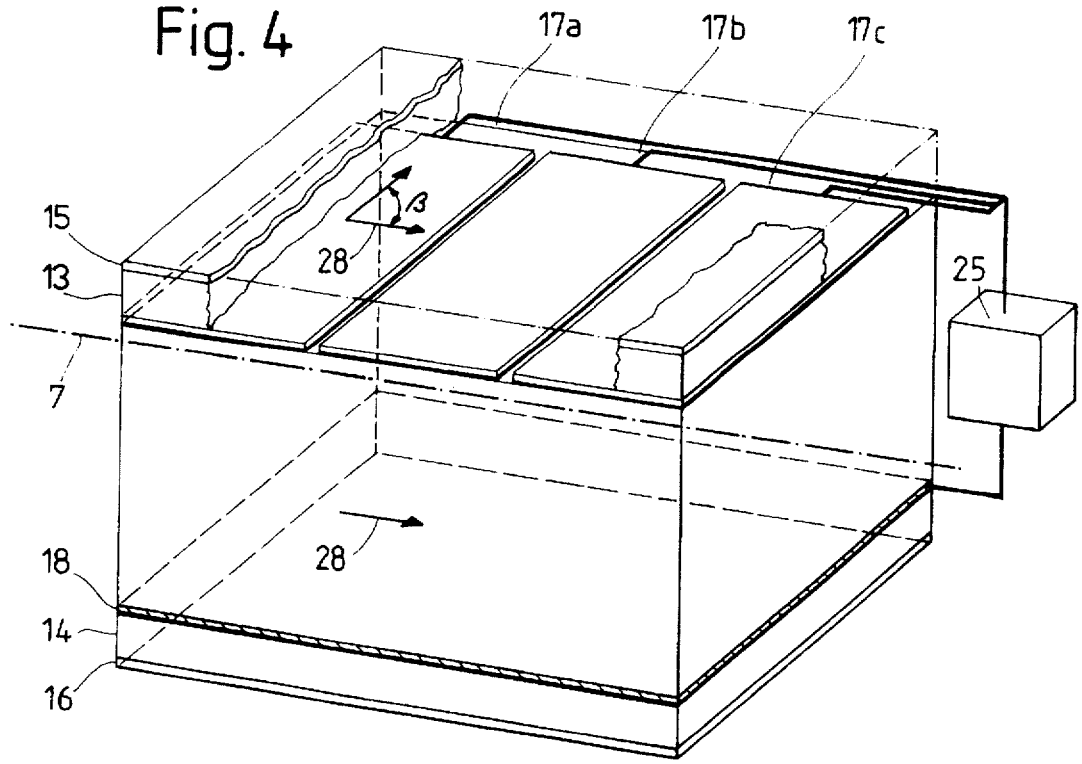

ns5,760,863

DHF FERROELECTRIC LIQUID CRYSTALLINE DISPLAY, SWITCHING OR IMAGE PROCESSING APPARATUS

BACKGROUND OF THE INVENTION

1. Field of the Invention

The invention relates to a liquid crystalline display, switching or image processing apparatus having a cell containing a ferroelectric, chiral smectic liquid crystalline layer, namely an apparatus according to the preamble of claim 1.

The cell has in particular a birefringent liquid crystal layer which is also referred to below as the $S_c^*$ layer and whose helical configuration can be influenced by the action of an electric field in such a way that the optical anisotropy of the liquid crystal changes.

The deformation of the crystal configuration by an electric field is described, for an example, in "Advances in Liquid Crystal Research and Applications, Oxford/Budapest, 1980, page 469 et seq." and is occasionally abbreviated in the literature with the designation DHF (for Deformed Helix Ferroelectric).

The invention relates, inter alia, to an directly viewed display and a projected display, i.e. a display apparatus having a liquid crystal display cell.

2. Description of the Prior Art

A known liquid crystal display cell based on the deformation of a helical liquid crystal configuration is disclosed in EP-B-0 309 774. Thus, the display cell disclosed in this prior publication and also referred to as a DHF cell has a pair of transparent plates which together enclose the $S_c^*$ layer and are each provided with a surface structure orienting the molecules of the $S_c^*$ layer, with electrodes for generating an electric field in the liquid crystal and with a polarizer each.

The surface structures facing the $S_c^*$ layer have an orienting effect on the adjacent liquid crystal molecules. The liquid crystals which can be used for the DHF cells preferably consist of a mixture of different chemical compounds and are therefore distinguished by the fact that the molecules belonging to a smectic layer and arranged essentially parallel to one another are arranged not perpendicularly to the smectic plane but at a smectic tilting angle θ relative to the normal of the plane. The chirality of the $S_c^*$ layer additionally results in the axes of the liquid crystal molecules being rotated relative to one another from layer to layer so that a screw-like helix having the pitch p is thus formed.

In the rest state, i.e. without an applied electric field, the DHF cell exhibits a certain light transmittance. If a voltage is applied to the electrodes, an electric field is generated in the $S_c^*$ layer and results in reorientation of the molecules and hence reorientation of the individual smectic layers. By applying the voltage, the helix of the $S_c^*$ layer is thus deformed, resulting in a change in the light transmittance.

This electro-optical effect on which the DHF display is based is known to a person skilled in the art. The starting point is a liquid crystal configuration which has a short pitch p. The pitch p is chosen so that the light is averaged over the turns of the helix, i.e. experiences only an averaged refractive index. Thus, a birefringent layer having an optical axis parallel to the helix axis is obtained for an undistorted helix. If a voltage is applied between the electrodes of the two plates, torques act on the individual smectic layers. These torques produce the stated deformation of the helix and thus also a rotation of the optical axis in a plane parallel to the plates bounding the liquid crystal layer. The rotation of the optical axis as a function of the applied voltage can be determined in practice by means of the switching angle α(U). The maximum switching angle α(U=$U_{max}$) is a characteristic feature of the DHF cell and corresponds to the angle of rotation of the optical axis between the voltage states U=0 and U=|$U_{max}$|.

In known DHF cells, it is assumed that they generate black/white displays with continuously changing gray steps. If, however, the electrode segments each defining an image dot are divided into three sub-electrodes and provided with suitable color filters for the colors red, green and blue, it is possible to produce in a known manner colored DHF displays in which the red, green and blue color dots can then be controlled from dark to lightest by means of a voltage source.

The commercial production of both black/white and colored DHF displays has scarcely become established to date. This is in particular because, on the basis of the known prior art, the DHF cells required for this purpose must expediently have a liquid crystal layer with the thickness d of about 1.4 to about 2.8 µm, which requires an expensive and complex production process.

SUMMARY OF THE INVENTION

The object of the invention is to provide a display or image processing apparatus having a DHF cell which in turn has a liquid crystal layer which is thicker than that of known DHF cells.

This object is achieved, according to the invention, by a liquid crystalline display or image processing apparatus having a cell containing a ferroelectric, chiral smectic, birefringent liquid crystal layer, at least one polarizer and electrical control means with at least one electrode which is divided into segments for representing image dots, wherein
 the electrical control means are formed in order to generate for each segment at least one driving voltage,
 the liquid crystal layer has a switching angle α(U) which is dependent on the applied voltage and whose maximum value α(U)=|$U_{max}$|) is equal to the angle of the optical axis between the voltages U=0 and U=|$U_{max}$|,
 the switching angle α(U=|$U_{max}$|) is at least 30°,
 the liquid crystal layer is arranged so that its helix axis makes an angle of 45° with the polarization direction of one polarizer, and
 at U=0 the following relationship is applicable for the birefringence Δn and the distance $d_{eff}$ covered by the light in the liquid crystal: 200 nm<Δn·$d_{eff}$<350 nm.

The achievement of the object according to the invention is based, inter alia, on model calculations and experiments which have shown that the mean value of the refractive index of a DHF display can be described with that of birefringent plate, so that, on application of a voltage at the electrodes of the DHF cell, not only the optical axis rotates but the magnitude of the birefringence Δn also changes.

On the basis of the knowledge that the mean value of the refractive index of a DHF display can be described with that of a birefringent plate, it has furthermore been found that particularly for DHF displays having a large switching angle α, the magnitude of the birefringence Δn changes significantly within a voltage range typical for DHF cells. The present invention therefore relates to the utilization of this second effect of the voltage dependence of Δn and has the object of substantially facilitating the production of DHF cells.

Advantageous embodiments of the invention are evident from the dependent claims.

DETAILED DESCRIPTION OF THE DRAWINGS

The invention is described in more detail below with reference to the attached drawings.

Figure 1:
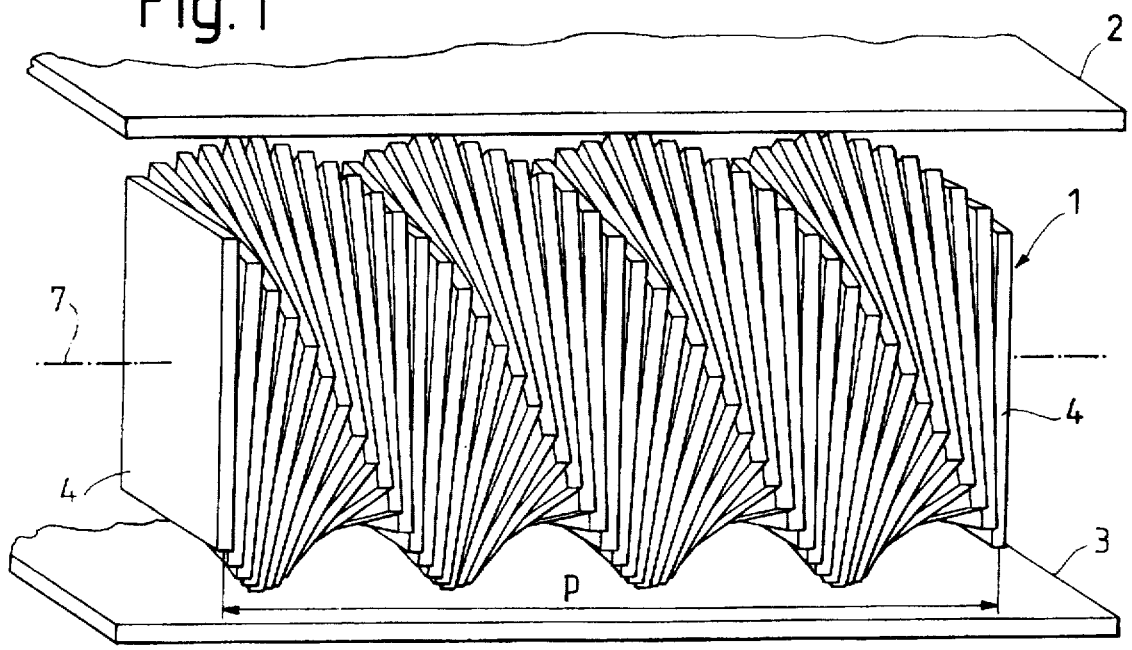
Figure 2:
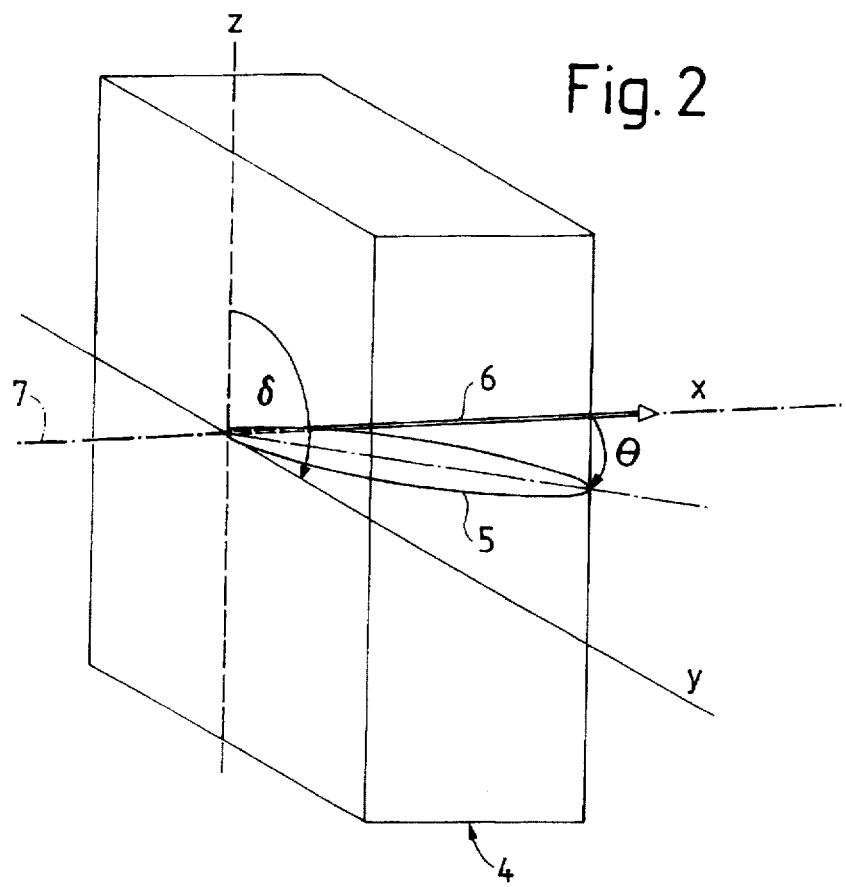
Figure 5:
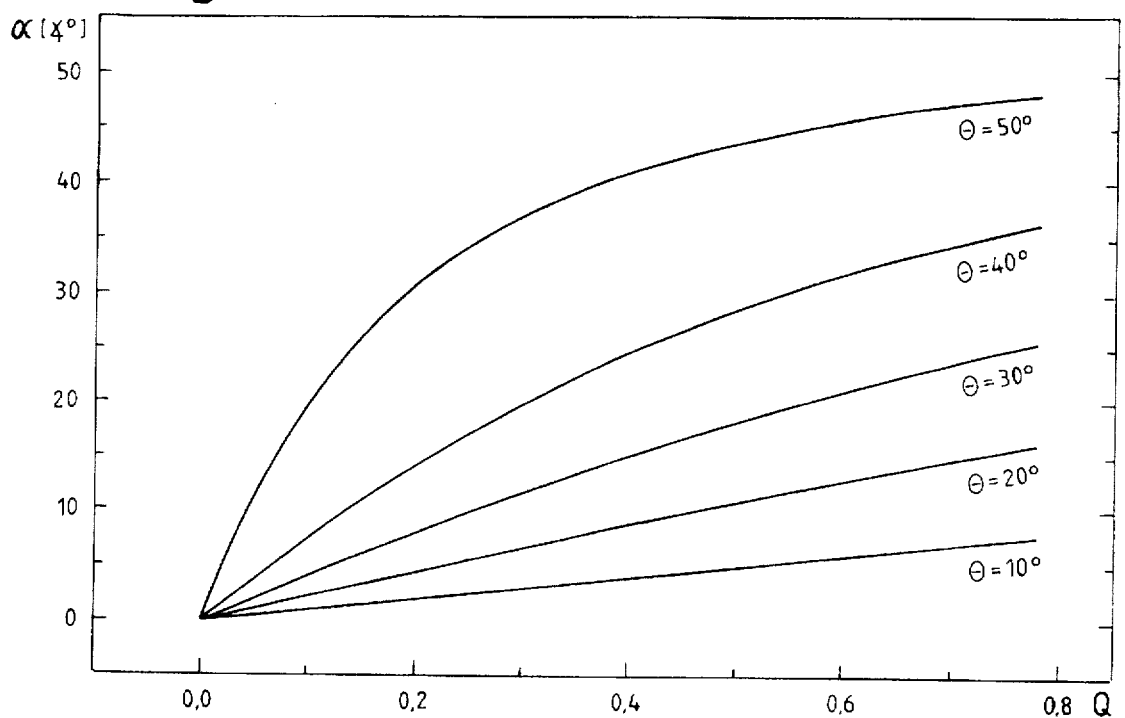
Figure 6:
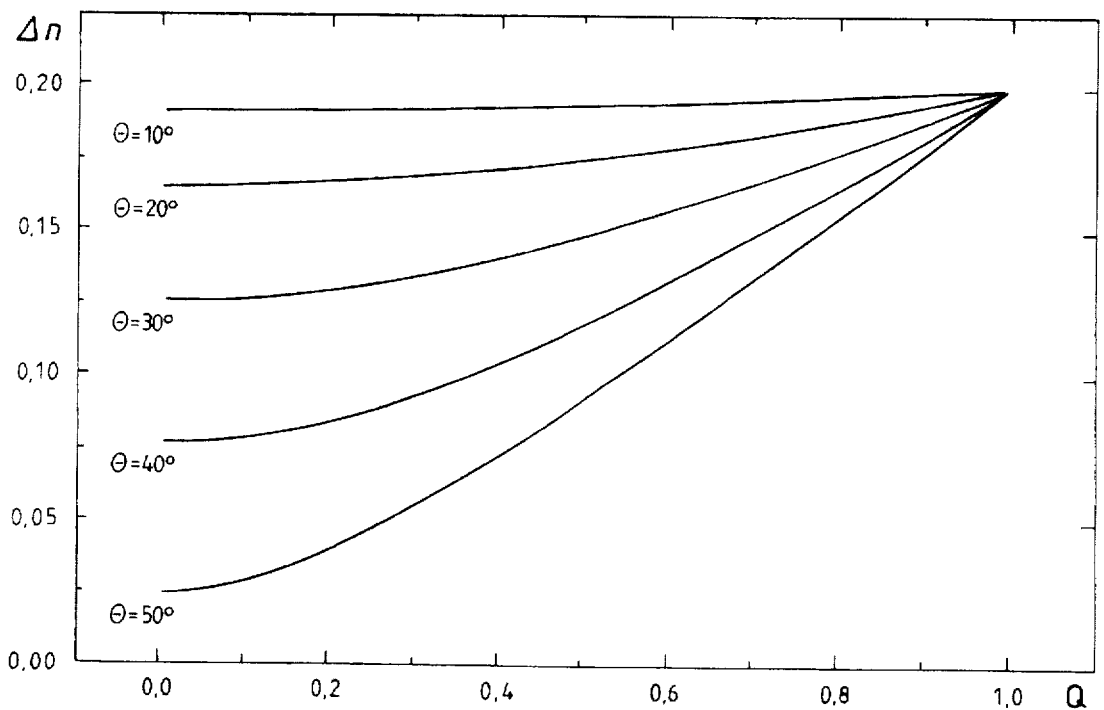
Figure 7:
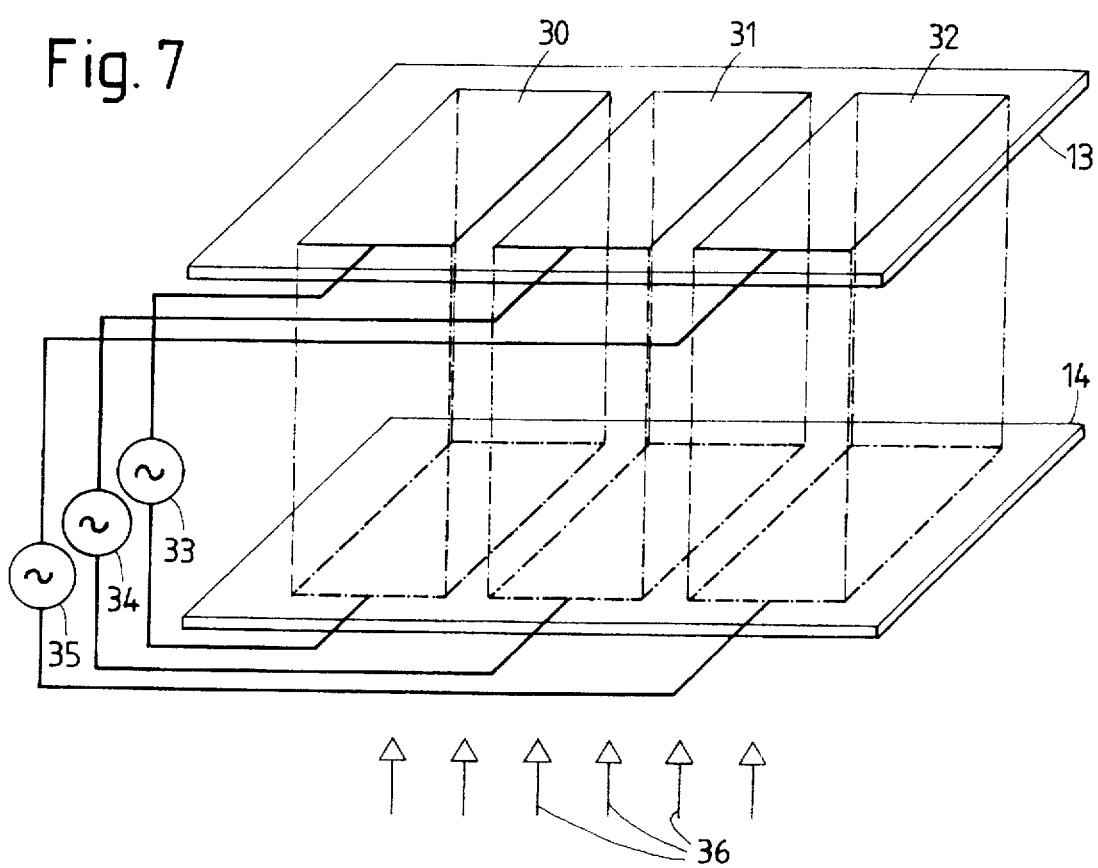
Figure 8:
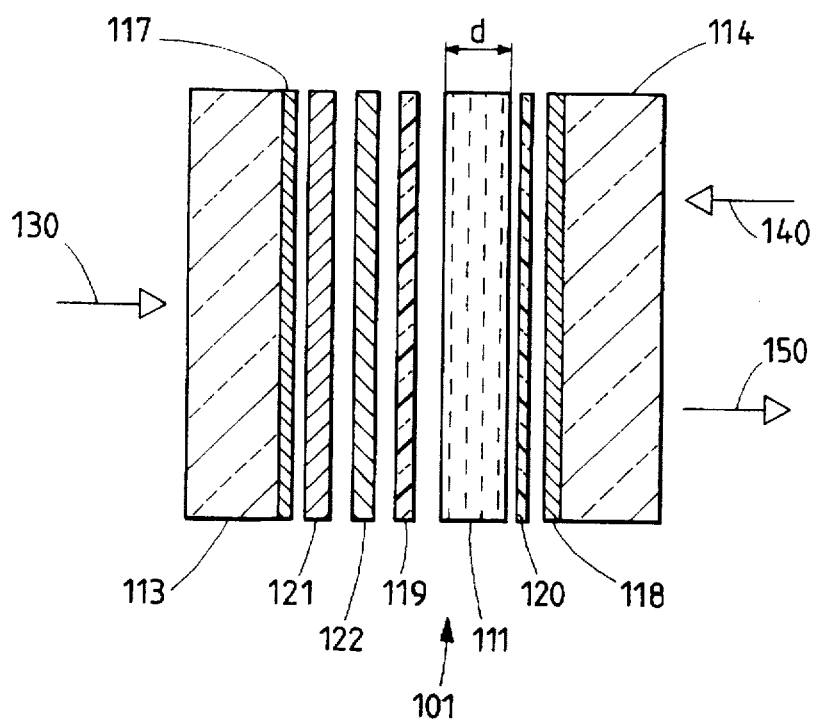
Figure 9:
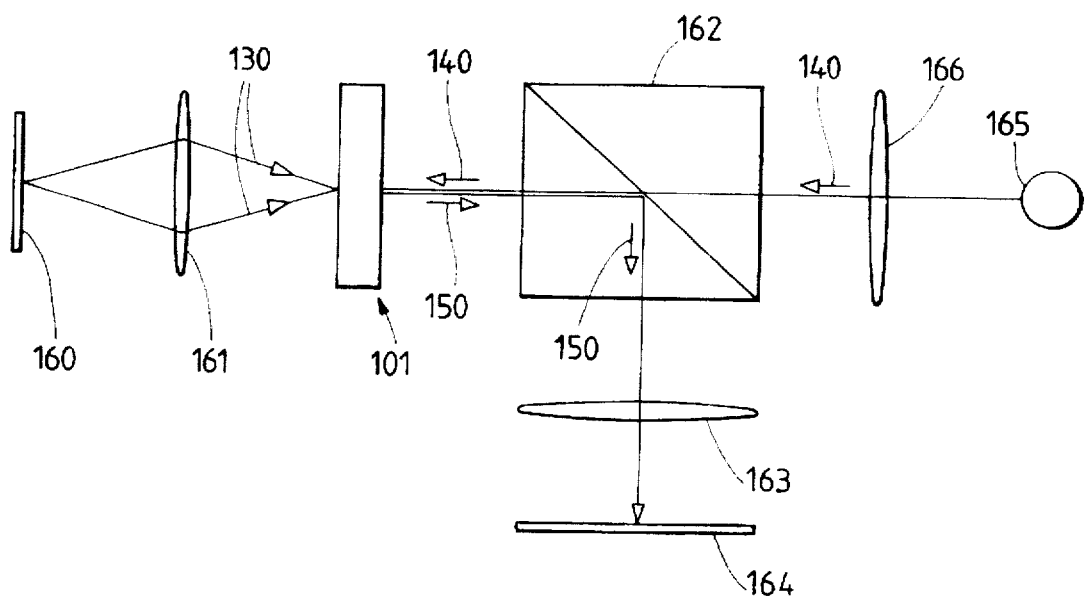
Figure 10:
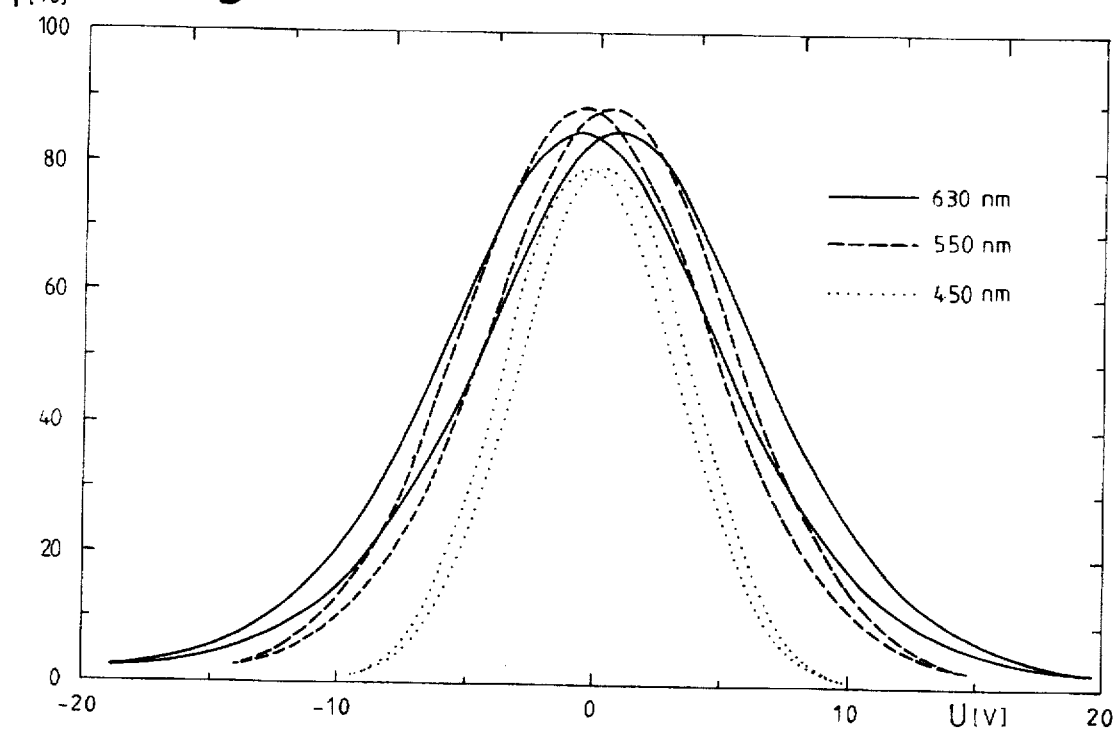

FIG. 1 shows a schematic view of the $S_c^*$ phase of a DHF cell,

FIG. 2 shows an enlarged schematic view of an individual smectic layer of the $S_c^*$ phase shown in FIG. 1, FIG. 3 shows a schematic section through a DHF cell, FIG. 4 shows a simplified, perspective view of that section of a DHF cell which is shown in FIG. 3, FIG. 5 shows a graphic representation of the dependence of switching angle α on that part of the charge Q which has flowed to the electrodes and which is influenced by the deformation of the helix, FIG. 6 shows a graphic representation of Δn as a function of that part of the charge Q which has flowed to the electrodes and which is influenced by the deformation of the helix, FIG. 7 shows a schematic view of an image dot of a colored DHF cell, FIG. 8 shows a schematic section through a reflecting DHF display cell, FIG. 9 shows a functional diagram of a projected display and FIG. 10 shows the light transmittance T of a "negative contrast" DHF cell as a function of the voltage, for the colors red, green and blue.

The tilting angle θ of the $S_c^*$ phase plays an important role with regard to the properties of a DHF display. This angle can be explained with the aid of FIGS. 1 and 2. Thus, FIG. 1 shows the helical liquid crystal configuration 1 of an $S_c^*$ layer, which in turn is bounded by an upper and lower glass sheet 2 and 3, respectively. The smectic layers 4 of the liquid crystal configuration 1 are perpendicular to the sheets 2 and 3 and—as already mentioned at the outset—are rotated relative to one another. As is evident from FIG. 2, the molecules 5 of each layer 4 which are arranged parallel to one another are inclined, by the tilting angle θ in the X-Y plane in the example shown, relative to the normal 6 of the plane or relative to the helix axis 7 parallel to the sheets 2 and 3. The angle δ in the Y-Z plane also serves for complete characterization of the configuration. For chiral smectic phases, this angle δ is not constant but increases from layer to layer. If, therefore, the x direction of the normal 6 of the plane is followed, the molecules 5 of the individual layers 4 move along a cone and thus form the stated helix.

Chiral dopants are added to the liquid crystal mixture in a known manner so that the pitch p of the helical configuration thus induced is smaller than the wavelength of visible light, i.e. smaller than about 500 nm. The light thus averages over this configuration. For the undeformed helix, this leads to a birefringent layer having an optical axis parallel to the helix axis 7—as already mentioned.

Before the electro-optical effects which can be produced by means of a DHF cell according to the invention—and which are essentially based on the additional voltage dependence of Δn—are explained with reference to an embodiment, the general structure of a colored DHF cell intended for installation in a directly viewed display will be described in more detail. The first embodiment described below in detail is also based on such a cell structure.

The DHF cell shown in FIGS. 3 and 4 and denoted as a whole by 10 has an $S_c^*$ layer 11 with a layer thickness d, which is arranged between two sheets 13 and 14 parallel to one another and comprising transparent material, for example glass or acrylic glass. Since this DHF cell is a cell for a directly viewed display, the distance $d_{\it{eff}}$ to be covered by the light within the liquid crystal is furthermore equal to the layer thickness d.

A polarizer 15, which is preferably connected to the sheet 13, for example adhesively bonded to said sheet, is present on the outside of the upper sheet 13. Accordingly, a polarizer 16 is coordinated in an analogous manner with the lower sheet 14.

On their surfaces facing the liquid crystal layer 11, the sheets 13 and 14 have transparent electrodes 17 and 18 which form the conventional electrode segments intended for representing characters or image dots, only the elements of an individual electrode segment being shown in the section of a DHF cell represented here. Thus, the upper section of the electrode 17 is divided into three sub-electrodes 17a, 17b and 17c, and the opposite section of the electrode 18, which, if required, may also be segmented, is provided with color filters 19, 20 and 21 coordinated with the individual subelectrodes 17a, 17b and 17c. Each subelectrode 17a, 17b and 17c also comprises electronic components 22, 23 and 24, such as, for example, thin-film transistors and the like. The latter, together with driver electronics 25 with which the sub-electrodes 17a, 17b and 17c coordinated with the primary colors can be controlled independently of one another, form the electronic control means stated in the preamble of claim 1.

Those surfaces of the glass sheets 13 and 14 which face the $S_c^*$ layer are furthermore treated in such a way that they have an orienting effect on the adjacent liquid crystal molecules and hence on the entire liquid crystal layer and thus determine the direction of the director. This treatment consists, for example, in coating with a polymer layer and in rubbing the surface in one direction. Other possibilities are oblique-incidence vapor deposition of orienting layers. Such layers are shown in FIG. 3 and denoted by 26 and 27. The result of such treatments is referred to below also as surface orientation. The surface orientation on the two sheets 13 and 14 is indicated by the arrow 28, the surface orientation of the upper sheet 13 being parallel to that of the lower sheet 14.

The polarizer 15 belonging to the upper sheet 13 is arranged in such a way that its polarization direction makes an angle β with the direction of the surface orientation or with the helix axis 7. In contrast, the polarizer 16 belonging to the lower sheet 14 is preferably arranged in such a way that its polarization direction is rotated by an angle of 90° relative to that of the upper polarizer 15. This orientation of the polarizers 15 and 16 represents a preferred embodiment. Other polarizer arrangements are also entirely possible, and good results are also achievable with them. Such arrangements can be readily determined by simple optimization.

As already mentioned, model calculations and experiments have shown that the mean value of the refractive index of a DHF display can be described with that of a birefringent sheet so that, when a voltage is applied to the electrodes of a DHF cell, not only the optical axis rotates but also the magnitude of the birefringence Δn changes.

FIG. 5 schematically shows results of such model calculations for the switching angle α as a function of that part of the charge Q which has flowed to the electrodes and which is influenced by the deformation of the helix. FIG. 6 furthermore shows the associated results of the birefringence Δn likewise related to Q. As can be seen, the switching angle α increases very linearly with Q. This applies in particular to the tilting angle θ which is smaller than about 30°. In this tilting angle range, the birefringence Δn too is only slightly dependent on the charge Q and hence also only slightly dependent on the applied voltage. For larger tilting angles θ, both behaviors change: thus, at a larger tilting angle θ, the switching angle α does not vary linearly with Q and Δn is small for Q=0 and hence for also U=0.

According to equation (1), the light transmittance T of a birefringent liquid crystal layer intended for direct viewing, between two polarizers crossed at right angles, is proportional to the product of an angle-dependent and a birefringence-dependent factor.

$$T \sim \sin^2(2\gamma) \cdot \sin^2(\pi \cdot \Delta n \cdot d/\lambda) \qquad (1)$$

In equation (1), γ is the angle between the optical axis and one of the two polarization directions, Δn is the magnitude of the birefringence, d is the thickness of the liquid crystal layer and λ is the wavelength of the light. The transmittance T thus depends both on the direction of the optical axis of the birefringent liquid crystal layer in relation to a polarization direction and on the magnitude of the birefringence Δn. Here and below, the symbol "~" stands for "proportional to". In a DHF display, both γ and Δn are dependent on the applied voltage U; thus, $\gamma=f_1(U)$ and $\Delta n=f_2(U)$. Owing to the dispersion, Δn is moreover dependent on the wavelength λ, so that for the sake of completion the following is applicable for the birefringence: $\Delta n=f_2(U,\lambda)$.

In the optically symmetrical mode of known directly viewed DHF displays, β=0, i.e. the helix axis 7 is parallel to the polarization direction of a polarizer. The transmittance T according to equation (1) is thus also zero for U=0, since γ in the rest state of the DHF cell is also zero. For |U|>0, the transmittance T increases owing to the factor $\sin^2(2\gamma)$ and does so until the maximum value of γ is reached. This maximum value is always smaller than the tilting angle θ. Since the helix winds up at higher voltages, 2γ reaches only about 60° even for a relatively large tilting angle of 35°. The transmittance T is thus dominated by the factor $\sin^2(2\gamma)$. As shown in FIG. 6, the second factor $\sin^2(\pi \cdot \Delta n \cdot d/\lambda)$ is not very voltage-dependent for small tilting angles and small switching angles and can therefore be optimized by a suitable choice of the liquid crystal layer thickness d. For a colored DHF cell of known design, the factor $\Delta n \cdot d/\lambda$ can therefore expediently be established so that the following is applicable at maximum voltage and at λ=560 nm:

$$\Delta n \cdot d/\lambda \sim 0.5 \qquad (2)$$

Since the maximum birefringence Δn·d in the case of this DHF cell is λ/2, such a DHF cell may also be referred to as a "λ/2" DHF cell. Since Δn is furthermore typically between 0.1 and 0.2, it follows that the optimum liquid crystal layer thickness d must be between 1.4 and 2.8 μm. The liquid crystal layer thickness d is thus very small. As already mentioned, such small electrode spacings make the production of DHF displays very difficult, particularly with regard to the danger of short-circuits and the necessity of maintaining extreme clean-room conditions and narrow tolerances for the layer thickness d in the production of such DHF cells.

The facilities in operation today and intended, for example, for the production of liquid crystal display cells of the type TN (Twisted Nematic), SBE (Super Birefringence Effect) or OMI (Optical Mode Interference) furthermore permit only the formation of 5–6 μm thick liquid crystal layers. The production of DHF displays having a layer thickness d of 1.4–2.8 μm thus also requires a novel production plant of enormous technical complexity. The possibility of producing a 5 μm DHF display is therefore a very important step on the way to the commercialization of the DHF technology.

The DHF cell according to the invention is now based on the DHF cell behavior described in FIGS. 5 and 6 and in equation (1). The main advantage of this DHF cell is that it may have substantially greater electrode spacings than the DHF cells which have become known to date.

According to the invention, this is a "negative-contrast" DHF cell, i.e. the corresponding display is light at U=0 and dark at |U|>0. This is achieved by choosing 45° for β. This means that, in a DHF cell of the type described above, the helix axis makes an angle of 45° with the polarization direction of a polarizer. At a voltage U=0, γ is then 45° (in general: γ=45° +α(U)) and the first factor of equation (1) is unity. A further characterizing feature of a DHF cell according to the invention is provided by the relationship of the birefringence Δn with the distance $d_{\mathit{eff}}$ covered by the light in the liquid crystal. For this relationship, the following condition is in fact also applicable: 200 nm<Δb·$d_{\mathit{eff}}$<350 nm.

The first embodiment is a DHF cell of the type described above. For this it is therefore true that $d_{\mathit{eff}}=d$.

In this example, the birefringence Δn and the liquid crystal layer thickness d are therefore chosen so that $$\Delta n(U=0) \cdot d/\lambda=0.5, \text{ where } \lambda=560 \text{ nm}.$$

In contrast to equation (2), which appears very similar, here the expression Δn·d/λ is established for the voltage U=0.

As is now evident from FIG. 6, at a large switching angle (α>30°) the value of Δn is 2 to 3 times smaller than at maximum applied voltage. The DHF display configured in this manner can therefore be, for example, a factor of 2 or 3 thicker than known DHF displays, which—as already described above—substantially simplifies the production of DHF displays. What is important is that, in the choice of the cell configuration described above, both factors in equation (1) decrease with increasing voltage |U|. Thus, a considerable reduction in the transmittance T can be achieved even when the switching angle is not exactly ±45°.

If the display is a colored DHF display, as in the present case, the following also has to be taken into account. The first factor in equation (1) is the same for all three primary colors. The maximum transmittance T for all primary colors is therefore also reached at the same voltage, i.e. the DHF cell passes through the conditions white, gray and black as a function of the voltage U, i.e. exhibits no color. As stated above, this no longer applies to large tilting angles θ (θ>35°) or to large switching angles α (α>30°). The factor $\sin^2(2\lambda)$ of equation (1) is dominant at low voltages, but at larger voltages the voltage dependence of Δn is so great that the second factor $\sin^2(\pi \cdot \Delta n \cdot d/\lambda)$ plays an important role there in determining the transmittance T. However, since this factor is wavelength-dependent, the dark state of the DHF display is reached at different voltages for the different colors. As a result of this, the driving voltages for the individual primary colors must be individually controlled.

FIG. 7 schematically shows the structure of an image dot of a colored DHF cell. Once again, the two sheets enclosing the liquid crystal layer are denoted by 13 and 14. The helix axis, which is not shown, is 45° with respect to one of the two polarizers, which are also not shown. The cell segments serving to represent an image dot are divided into the three color pixels, each having a sub-electrode 30, 31 and 32, for the colors red, green and blue. The driver electronics also referred to in the field as active matrix, is composed, according to the invention, of three voltage sources 33, 34 and 35 controllable independently of one another. The light ray incident on the DHF cell is indicated by the arrow 36. According to the invention, the signals which can be generated by the voltage sources 33, 34 and 35 should now pass through different voltage values, the following being applicable: $U_{max.red} > U_{max.green} > U_{max.blue}$. If the maximum voltages $U_{max.red}$, $U_{max.green}$ and $U_{max.blue}$ are present simultaneously at the corresponding color dots, the so-called color pixels, the image dot formed by the three color pixels should then have maximum darkness and should be virtually black. In the case of $U_{max.red.green.blue}$, the pitch difference of the DHF display for the corresponding colors is just about equal to the wavelength, so that this display may also be referred to as a "negative-contrast" λ DHF display.

Instead of the three different driving voltages, it is also possible to choose different cell thickness d at the color pixels. This can be achieved, for example, by making the color filters of different thicknesses, in which case the blue filter is chosen to be the thickest and the red filter the thinnest.

In addition to the most important advantage, the larger layer thickness, this "negative-contrast" λ DHF display also has the following benefit: its dark state is substantially less sensitive to wall orientation errors than that of λ/2 DHF displays of the type described above, whose dark state occurs at α=0. At λ=0, small fluctuations in the helix orientation do in fact lead to regions with λ<>0, i.e. to an undesired transmittance and hence to a reduction in the contrast of the λ/2 DHF display. In contrast, both factors of equation (1) are very small in the case of the "negative-contrast" λ DHF display, greatly reducing the sensitivity to variations of the first factor, which is influenced in particular by orientation fluctuations. A poorly oriented "negative-contrast" λ DHF display therefore also has high contrast. Since the light state is not very sensitive to orientation errors, this results in greatly improved behavior of "negative-contrast" λ DHF displays which is little impaired by cell parameters.

A further advantage of the "negative-contrast" λ DHF display is associated with the method of electrical driving of DHF cells. To avoid a charge build-up on the DHF cell and the generation of associated "ghost images" in video displays, the polarity of the voltage applied to the DHF cell is periodically reversed. This can be efficiently achieved by applying a large reset pulse having the polarity of the next image before the actual image signal. The "negative-contrast" λ DHF display now has the advantage that the reset state is dark. This permits the use of relatively long reset pulses without the contrast of the DHF display suffering as a result.

In addition, the use of relatively gradated driving voltages for the color pixels of the three primary colors substantially reduces the energy consumption of a DHF cell. This is advantageous in particular for portable electronic devices, such as laptops, video cameras and miniature televisions.

DHF cells of the type according to the invention can also be used in a projected display. Thus, a second embodiment, namely a DHF cell which can be used for a projected display, is shown schematically in FIG. 8. FIG. 9 shows the mode of operation of the corresponding display, which is known per se.

The DHF cell denoted as a whole in FIG. 8 by 101 has, as in the case of the DHF cell 10 described above, an $S_c^*$ layer 111 having a layer thickness d, which is arranged between two glass sheets 113 and 114 parallel to one another. On their surfaces facing the liquid crystal layer 111, the sheets 113 and 114 have transparent electrodes 117 and 118 which form the conventional electrode segments intended for the representation of characters or image dots.

An orientation layer 119 or 120 is furthermore arranged on each of the two sides of the liquid crystal layer 111, as already described above. As is also evident from FIG. 8, the DHF cell 101 is provided, for this particular purpose, also with a light-absorbing photoconductor 121 and a dielectric mirror 122, as known for reflecting projected displays.

In the operating state, the DHF cell 101 is arranged in such a way that the recording light 130 passes through the glass sheet 113 and the reading light 140 through the glass sheet 114. During operation of the projected display, the image 160 is projected by the lens 161 onto the photoconductor 121 of the DHF cell 101 and is absorbed by said photoconductor. The recording light 130 produces a modulation of the conductivity on the photoconductor 121, which modulation corresponds to the image information. This modulation is converted into a voltage modulation across the liquid crystal with the aid of a voltage source connected to the electrodes 117 and 118, whereupon said liquid crystal is correspondingly deformed.

At the same time, a reading light 140 which serves for image reproduction is polarized by a beam divider 162 and reflected by the dielectric mirror 122. The reading light reflected in this manner, in the form of a light with modulated polarization, is then once again incident on the A beam divider 162. This acts as an analyzer for the reflected light beam and reflects only the polarization component perpendicular to the incident light, i.e. the beam divider performs the function of crossed polarizers. The light reflected by the beam divider 162 is finally projected by a suitable optical system having a lens 163 onto the screen 164.

From the sequence of operations described above, it is evident that the light beam generated by the light source 165 and incident on the DHF cell 101 through the lens 166 and the beam divider 162 passes through the birefringent liquid crystal layer 111 twice, as is the case per se for all reflecting displays, namely as reading light 140 and as modulated light 150. Accordingly, distance $d_{eff}$ covered by the light in the liquid crystal is twice as great as the thickness d of the liquid crystal layer, i.e. 2d. In addition, in this apparatus the light source 165 may be substantially more intense than the recording light 130, so that the entire arrangement then also acts as a light amplifier.

At this point it should also be pointed out that the above-described DHF cells or display apparatuses according to the invention represent only a selection from a plurality of possible embodiments of DHF cells and electro-optical apparatuses and that a DHF cell or DHF display according to the invention may be not only in the form of a directly viewed display or reflecting projected display but very generally in the form of a reflected display or of a so-called "Head Mounted Display".

Furthermore, instead of the three-part segmentation of the electrodes, colored DHF displays of the type according to the invention may also have one-part electrode segments which then in turn are driven within a predetermined time interval alternately for the red, green and blue light. In this case, an image dot is generated by averaging the signals belonging to an individual segment over this time interval.

Finally, other optical and electro-optical apparatuses may also be equipped with DHF cells of the type according to the invention. Examples are optical switches, such as those known, for example, from "Applied Optics 27, 1727 (1988), K. M. Johnson et al.", or apparatuses for image or sample recognition. The latter are known from "Applied Optics 5, 1248 (1966), C. S. Weaver et al." or "Optics Communications 76, 97 (1990), D. A. Jared et al." and serve, for example, for comparing fingerprints of persons with a library of fingerprints.

Further data and information on the above-mentioned embodiments are given below.

A suitable liquid crystal mixture which can be used for the purpose according to the invention is the liquid crystal mixture FLC 10827 from Rolic AG, Basle. The physical properties of this mixture are shown in Table I and the chemical composition in Table II.

TABLE I

Physical data of the test mixture FLC 10827

| Phase sequence | Isotropic-108° C.-cholesteric-74° C.-$S_c$* | |
| --- | --- | --- |
| Spontaneous polarization | 97 | $nC/cm^2$ |
| Tilting angle θ | 42.5 | ° |
| Helix pitch | <200 | nm |

TABLE II

Chemical composition of the test mixture

| Concentration g/g | Structure | The configuration of the chiral side chain is S, that of the dioxanes: |
| --- | --- | --- |
| 0,2167 | | |
| 0,1150 | | |
| 0,0999 | | |
| 0,0972 | | |
| 0,0929 | | |
| 0,1084 | | |
| 0,1079 | | |

TABLE II-continued

Chemical composition of the test mixture

| Concentration g/g | Structure | The configuration of the chiral side chain is S, that of the dioxanes: |
|---|---|---|
| 0.0307 | | |
| 0.0036 | | |
| 0.0031 | | |
| 0.0035 | | |
| 0.0174 | | |
| 0.0174 | | |
| 0.0087 | | |
| 0.0087 | | |
| 0.0434 | | |
| 0.0262 | | |

The test cells used in the laboratory investigations are coated with transparent indium tin oxide electrodes and provided with an insulating ion blocking layer and a rubbed polyimide layer with parallel rubbing directions. The cells were filled at 100° C. by capillary action and slowly cooled with an applied electric field (10 V/μm square-wave, varied from 10 to 1000 Hz). The latter is optional but may improve the contrast.

First Embodiment

In this DHF cell, the layer thickness d was chosen so that all three colors have virtually the same maximum transmittance at U=0.

FIG. 10 shows the transmittance/voltage curves of a 5.3 μm thick "negative-contrast" λ DHF cell for blue, green and red light. The transmittance values of these curves are divided by a standard spectrum. The standard spectrum is the transmittance of the same cell, recorded with polarizers and helix axis positioned parallel to one another. The most important feature of these curves is that the minimum is reached at about ±19 V for the color red (630 nm), at about ±15 V for green (550 nm) and at about ±10 V for blue (450 nm).

Optical switch having a DHF cell of the type according to the invention

Compared with known ferroelectric switches, optical switches having a DHF cell of the type according to the invention have the advantage that the switch can be reprogrammed merely by changing the voltage applied to the cell to a different wavelength, and that operation free of d.c. voltage is possible by periodic pole reversal.

Apparatus for image and pattern recognition

Image and pattern recognition by means of a DHF cell according to the invention is based essentially on the JFT (Joint Fourier Transform) technique, in which two lenses are intended for Fourier transformation. Here, two images present side by side are subjected to Fourier transformation by a first lens, this Fourier transformation is visualized by means of a DHF cell of the type according to the invention, for example by a reflecting SLM DHF cell (SLM stands for Spatial Light Modulator), and the image thus obtained is again subjected to Fourier transformation by means of a second lens. This gives a cross-correlation function of the two images, which becomes a light dot if the two images are identical. Compared with electronic image processing, this optical JFT method has the important advantage that it is very fast.

We claim:

1. A liquid crystalline display, switching or image processing apparatus having a cell containing a ferroelectric, chiral smectic, birefringent liquid crystal layer, at least one polarizer and electrical control means for generating an electric field in the liquid crystal layer, where the cell has a pair of sheets which enclose the liquid crystal layer and each of which is provided with a surface structure which orients the molecules of the liquid crystal layer and an electrode for generating the electric field, the cell and at least one electrode are divided into segments for representing image dots, the electrical control means are formed in order, during operation of the display apparatus, to generate for each segment at least one driving voltage which serves for modulating the light transmittance and is in a voltage range limited beforehand by $U=0$ and $U=|U_{max}|$, and the liquid crystal layer has a switching angle $\alpha(U)$ which is dependent on the applied voltage and whose maximum value $\alpha(U=|U_{max}|)$ is equal to the angle of the optical axis between the voltages $U=0$ and $U=|U_{max}|$, wherein, during operation of the apparatus, the switching angle $\alpha(U=|U_{max}|)$ is at least 30°, wherein the liquid crystal layer is arranged so that its helix axis makes an angle of 45° with the polarization direction of one polarizer, and wherein at $U=0$ the following relationship is applicable for the birefringence $\Delta n$ and the distance $d_{eff}$ covered by the light in the liquid crystal: 200 nm $< \Delta n \cdot d_{eff} <$ 350 nm.

2. A display apparatus as claimed in claim 1, having color filters for generating a red, green and blue light beam from white light, where the display cell and at least one electrode are divided, for representation of colored image dots, into segments-each having three color pixels for the primary colors red, green and blue, and the electrode segments each comprise three sub-electrodes, each of which is coordinated with a color pixel, wherein the sub-electrodes of each electrode segment are each connected to a separate voltage source with the voltages $U_{red}$, $U_{green}$ and $U_{blue}$, the voltage ranges for the red, green and blue color pixels being of different magnitudes, and the voltage range for the primary color red being the largest and that for the primary color blue being the smallest.

3. A display apparatus as claimed in claim 1, which comprises a display cell intended for direct viewing and having a liquid crystal layer of thickness d which, in the operating state, is equal to $d_{eff}$.

4. A display apparatus as claimed in claim 3, wherein the liquid crystal layer is 2.8–6 µm thick.

5. A display apparatus as claimed in claim 1, which comprises a display cell intended for light reflection and having a liquid crystal layer of thickness d which, in the operating state, is equal to ½·$d_{eff}$.

* * * * *